(12) United States Patent
Cao et al.

(10) Patent No.: US 11,473,562 B2
(45) Date of Patent: Oct. 18, 2022

(54) TOWER SEGMENT, TOWER SEGMENTATION METHOD, AND WIND TURBINE

(71) Applicant: BEIJING GOLDWIND SCIENCE & CREATION WINDPOWER EQUIPMENT CO., LTD., Beijing (CN)

(72) Inventors: Xudong Cao, Beijing (CN); Jinlei Liu, Beijing (CN); Ziping Zhang, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 174 days.

(21) Appl. No.: 17/041,095

(22) PCT Filed: May 10, 2019

(86) PCT No.: PCT/CN2019/086378
§ 371 (c)(1),
(2) Date: Sep. 24, 2020

(87) PCT Pub. No.: WO2020/062881
PCT Pub. Date: Apr. 2, 2020

(65) Prior Publication Data
US 2021/0108613 A1 Apr. 15, 2021

(30) Foreign Application Priority Data
Sep. 30, 2018 (CN) .......................... 201811159412.4

(51) Int. Cl.
*F03D 13/20* (2016.01)
*B26D 3/24* (2006.01)
(Continued)

(52) U.S. Cl.
CPC ............... *F03D 13/20* (2016.05); *B26D 3/16* (2013.01); *B26D 3/24* (2013.01); *E04H 12/085* (2013.01); *F03D 13/40* (2016.05); *F05B 2230/60* (2013.01)

(58) Field of Classification Search
CPC ........... F03D 13/20; F03D 13/40; B26D 3/16; B26D 3/24; E04H 12/085; F05B 2230/60
See application file for complete search history.

(56) References Cited

U.S. PATENT DOCUMENTS 6,715,243 B1 * 4/2004 Fons .......................... E04H 7/30
52/192
7,802,412 B2 * 9/2010 Jensen .................... F03D 13/10
52/651.07
(Continued)

FOREIGN PATENT DOCUMENTS

CN 105545609 A 5/2016
CN 205423080 U 8/2016
(Continued)

OTHER PUBLICATIONS

First Chinese Office Action Application No. 201811159412.4; dated Apr. 30, 2019.
(Continued)

*Primary Examiner* — Mickey H France

(57) ABSTRACT

A tower segment, a tower, a segmentation method, and a wind turbine. The tower segment includes an annular body having two opposite end faces along the axial direction thereof, the annular body being formed by assembling a plurality of tower pieces; and a connecting member configured for connecting the two adjacent tower pieces, the connecting member including a first connecting piece and a second connecting piece that can be detachably connected to each other, wherein the side of the first connecting piece away from the second connecting piece is fixedly connected
(Continued)

to an inner annular surface and an outer annular surface of one of the two adjacent tower pieces, and the side of the second connecting piece away from the first connecting piece is fixedly connected to the inner annular surface and the outer annular surface of the other of the two adjacent tower pieces.

18 Claims, 7 Drawing Sheets

(51) Int. Cl.
  *E04H 12/08* (2006.01)
  *B26D 3/16* (2006.01)
  *F03D 13/40* (2016.01)

(56) References Cited

U.S. PATENT DOCUMENTS

| | | | | |
|---|---|---|---|---|
| 8,056,297 | B2* | 11/2011 | Mathai | E04H 12/08 52/301 |
| 8,209,913 | B2* | 7/2012 | Murata | E04H 12/08 52/844 |
| 8,234,837 | B2* | 8/2012 | Koren | E04C 3/30 52/843 |
| 8,250,833 | B2* | 8/2012 | Thomsen | E04H 12/085 52/745.12 |
| 8,256,174 | B2* | 9/2012 | Irniger | E04H 12/12 52/249 |
| 8,281,547 | B2* | 10/2012 | Hettick | E04H 12/02 52/843 |
| 8,590,276 | B2* | 11/2013 | Kryger | F03D 13/22 52/843 |
| 8,597,564 | B2* | 12/2013 | Holscher | E04H 12/12 264/333 |
| 8,651,819 | B2* | 2/2014 | Giuffre | F03D 1/0675 416/209 |
| 8,826,614 | B2* | 9/2014 | Garcia Maestre | E04H 12/085 52/223.5 |
| 8,844,237 | B2* | 9/2014 | Kapitza | F03D 13/20 52/651.01 |
| 8,904,738 | B2* | 12/2014 | Gonzalez Del Egido | E04H 12/085 52/848 |
| 8,919,074 | B2* | 12/2014 | Meyer | E04H 12/30 52/745.17 |
| 9,021,757 | B2* | 5/2015 | Hangel | E04C 1/39 52/745.18 |
| 9,091,095 | B2* | 7/2015 | Bogl | E04H 12/12 |
| 9,166,274 | B2* | 10/2015 | Bennett | E04H 12/085 |
| 9,175,492 | B2* | 11/2015 | Garcia Maestre | F03D 13/20 |
| 9,249,597 | B2* | 2/2016 | Stiesdal | F03D 13/10 |
| 9,624,687 | B2* | 4/2017 | Aranzadi De Miguel | H01Q 1/1242 |
| 9,850,674 | B1* | 12/2017 | Paura | F03D 13/10 |
| 9,920,748 | B2* | 3/2018 | Nielsen | F03D 13/10 |
| 9,951,513 | B2* | 4/2018 | Ladret | E04B 1/06 |
| 10,018,187 | B2* | 7/2018 | Michel | B23D 45/006 |
| 10,041,479 | B2* | 8/2018 | Pedersen | E04H 12/085 |
| 10,053,886 | B2* | 8/2018 | Pal | E04B 1/48 |
| 10,113,327 | B2* | 10/2018 | Dobrusky | E04H 12/185 |
| 10,138,649 | B2* | 11/2018 | Pedersen | F03D 13/20 |
| 10,145,138 | B2* | 12/2018 | Pedersen | F03D 13/40 |
| 10,184,262 | B2* | 1/2019 | Pedersen | E04H 12/34 |
| 10,208,498 | B2* | 2/2019 | Pedersen | E04H 12/342 |
| 10,273,705 | B2* | 4/2019 | Tuerk | F03D 13/20 |
| 10,787,834 | B2* | 9/2020 | Pedersen | F03D 80/70 |
| 10,794,365 | B2* | 10/2020 | Longeru | E04H 12/342 |
| 10,815,656 | B2* | 10/2020 | Kersten | E04H 5/02 |
| 11,118,371 | B2* | 9/2021 | Kersten | E04H 12/085 |
| 11,118,570 | B2* | 9/2021 | Lancha Fernandez | E04H 12/12 |
| 11,255,312 | B2* | 2/2022 | Küpker | F03D 13/20 |
| 2014/0190115 | A1 | 7/2014 | Brenner et al. | |
| 2019/0003199 | A1 | 1/2019 | Porm et al. | |
| 2020/0158089 | A1 | 5/2020 | Zhang et al. | |
| 2021/0108613 | A1* | 4/2021 | Cao | B26D 3/16 |

FOREIGN PATENT DOCUMENTS

| | | |
|---|---|---|
| CN | 205823552 U | 12/2016 |
| CN | 106762444 A | 5/2017 |
| CN | 107654338 A | 2/2018 |
| CN | 107725281 A | 2/2018 |
| CN | 108167125 A | 6/2018 |
| CN | 207513756 U | 6/2018 |
| CN | 207701296 U | 8/2018 |
| CN | 109139386 A | 1/2019 |
| DE | 102016125062 A1 | 6/2018 |
| DE | 202017006845 U1 | 8/2018 |
| EP | 3315694 A1 | 5/2018 |
| WO | 2012/168387 A2 | 12/2012 |
| WO | 2016/207322 A1 | 12/2016 |

OTHER PUBLICATIONS

Extended European Search Report dated Jul. 21, 2021; Appln. No. 19867244.6.
International Search Report dated Aug. 2, 2019; PCT/CN2019/086378.

* cited by examiner

US 11,473,562 B2

TOWER SEGMENT, TOWER SEGMENTATION METHOD, AND WIND TURBINE

CROSS-REFERENCE TO RELATED APPLICATIONS

The present application is the national phase of International Application No. PCT/CN2019/086378, titled "TOWER SEGMENT, TOWER, SEGMENTATION METHOD, AND WIND TURBINE," filed on May 10, 2019, which claims priority to Chinese Patent Application No. 201811159412.4, titled "TOWER SEGMENT, TOWER, METHOD FOR DIVIDING TOWER SEGMENT, AND WIND TURBINE," filed on Sep. 30, 2018, the entire disclosures of which are hereby incorporated herein by reference.

FIELD

The present application relates to the technical field of wind power technology, and in particular to a tower segment, a tower, a method for dividing a tower segment, and a wind turbine.

BACKGROUND

A tower is an important structural form of soaring structures, which is widely used in fields of transmission towers, television towers, cooling towers and the like. Especially in the field of wind power generation, the tower can be used to support portions such as the upper rotor and the generator set. With the increase of the power of the wind turbine, the diameter of the rotor increases, correspondingly, the height of the tower increases, and the section becomes larger.

In order to meet the requirements of the height limit of transportation, the tower with the large diameter is generally divided into pieces to form multiple tower pieces, and after being transported to the installation site of the tower, the divided tower pieces are assembled to form the tower. However, in the conventional technology, the design of the connecting member for connecting the tower pieces is not rational, which may cause great damage to the tower piece when it is connected to another corresponding tower piece, and thus when the tower pieces are assembled with one another, the connection is difficult and gaps are apt to form, which adversely affects the load bearing capacity of the tower.

Therefore, a new tower segment, a tower, a dividing method and a wind turbine are required.

SUMMARY

A tower segment, a tower, a dividing method and a wind turbine are provided according to the embodiments of the present application. The connection strength between the connecting member and the tower piece is high, and the damage to the tower pieces is small, so that when the tower pieces are assembled with each other, the connection is simple and the mutual assembling gap is small, and thus the load bearing capability of the tower is ensured.

A tower segment is provided according to one aspect of the embodiment of the present application. The tower segment includes an annular body, wherein the annular body; has two opposite end faces in an axial direction thereof, the annular body is formed by assembling a plurality of tower pieces, and an accommodating groove extending in the axial direction is provided between each two adjacent tower pieces, and the accommodating groove runs through a wall portion of the annular body in a thickness direction of the annular body; and a connecting member, wherein the two adjacent tower pieces are connected to each other through the connecting member, the connecting member includes a first connecting piece and a second connecting piece detachably connected to each other, and the first connecting piece and the second connecting piece are arranged in the accommodating groove; a side of the first connecting piece away from the second connecting piece is fixedly connected to an inner annular face and an outer annular face of one of the two adjacent tower pieces, and a side of the second connecting piece away from the first connecting piece is fixedly connected to an inner annular face and an outer annular face of the other of the two adjacent tower pieces.

A tower is provided according to another aspect of the embodiment of the present application, including two or more above tower segments, and the two or more tower segments are stacked and connected with each other in the axial direction.

A method for dividing a tower segment is provided according to yet another aspect of the embodiment of the present application, including the following steps:

providing an annular segment structure, wherein the annular segment structure is provided with two or more accommodating grooves arranged at intervals and surrounding an axis of the annular segment structure, and each of the accommodating grooves extends in an axial direction of the annular segment structure and runs through the annular segment structure in a thickness direction of the annular segment structure;

arranging connecting members, wherein each of the connecting members includes a first connecting piece and a second connecting piece detachably connected with each other, the connecting member is arranged in the accommodating groove, and each of the first connecting piece and the second connecting piece is fixedly connected to an inner wall surface and an outer wall surface of the annular segment structure; and dividing the annular segment structure into pieces, wherein the annular segment structure is cut along the axial direction of the annular segment structure, each of the accommodating grooves is connected to a cutting slit to form a dividing groove running through the annular segment structure in the axial direction, and the dividing groove separates the first connecting piece and the second connecting piece arranged in the corresponding accommodating groove from each other, to complete dividing of the tower segment.

A wind turbine is provided according to still another aspect of the embodiment of the present application, including the above tower.

According to the tower segment, the tower, the dividing method and the wind turbine provided by the embodiment of the present application, the tower segment includes the annular body and the connecting member. The accommodating groove extending in the axial direction of the annular body is provided between the two adjacent tower pieces of the annular body. The accommodating groove runs through the wall portion of the annular body in the thickness direction of the annular body. The two adjacent tower pieces are connected to each other by the connecting member. The connecting member includes the first connecting piece and the second connecting piece which can be detachably connected to each other. The side of the first connecting piece away from the second connecting piece is fixedly connected to the inner annular face and the outer annular face of one of the two adjacent tower pieces, and the side of the second connecting piece away from the first connecting piece is fixedly connected to the inner annular face and the outer annular face of the other of the two adjacent tower pieces, so that each one of the first connecting piece and the second connecting piece is connected to both the inner annular face and the outer annular face of the corresponding tower piece, which can ensure the connection strength between the connecting piece and the corresponding tower piece. Moreover, with this arrangement, the damage to the tower pieces can be reduced, and a gap between the tower pieces is small when the tower pieces are assembled with each other, thereby ensuring the load bearing capability of the tower segment or the tower having the tower segment.

BRIEF DESCRIPTION OF THE DRAWINGS

The features, advantages and technical effects of an exemplary embodiment of the present application will be described hereinafter with reference to the drawings.

REFERENCE NUMERALS

Figure 1:
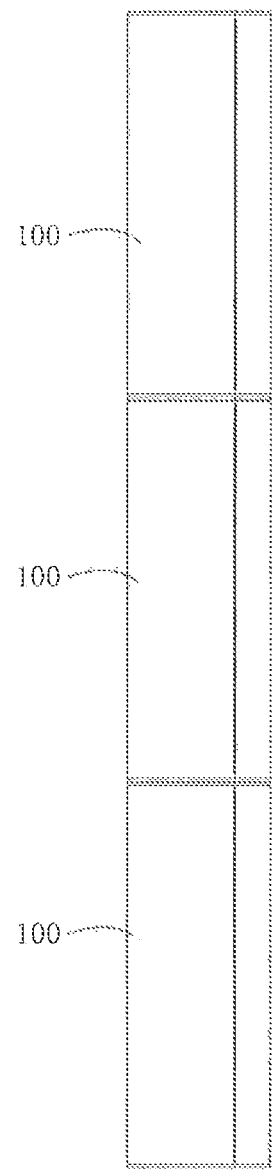
FIG. 1 is a schematic view showing the structure of a tower according to an embodiment of the present application.

| 100 | tower segment, | X | axial direction, |
|---|---|---|---|
| Y | thickness direction, | 10 | annular body, |
| 10a | end face, | 11 | tower piece, |
| 111 | inner annular face, | 112 | outer annular face, |
| 12 | accommodating groove, | b | predetermined distance, |
| 20 | connecting member, | 21 | first connecting piece, |
| 211 | first surface, | 212 | first arc angle, |
| 213 | third surface, | 214 | third arc angle, |
| 215 | first cutting mark, | 215a | first cutting segment, |
| 216 | first reserved area, | 217 | first area to be cut, |
| c | distance, | e | minimum thickness, |
| 22 | second connecting piece, | 221 | second surface, |
| 222 | second arc angle, | 223 | fourth surface, |
| 224 | fourth arc angle, | 225 | second cutting mark, |
| 225a | second cutting segment, | 226 | second reserved area, |
| 227 | second area to be cut, | d | distance, |

-continued

| f | minimum thickness, | 23 | fastener, |
|---|---|---|---|
| 30 | circumferential flange, | 40 | annular segment structure, |
| M | axial direction, | N | thickness direction, |
| 41 | inner wall surface, | 42 | outer wall surface. |

In the drawings, the same members are indicated by the same reference numerals. The drawings are not drawn to actual scale.

DETAILED DESCRIPTION OF THE EMBODIMENTS

The features of various aspects and exemplary embodiments of the present application are described hereinafter in detail. In the following detailed description, many specific details are provided to facilitate all-sided understanding of the present application. However, it is apparent to those skilled in the art that, the present application may be implemented without some of these specific details. The following description of the embodiments is only intended to provide better understanding of the present application by illustrating embodiments of the present application. In the drawings and the following description, at least part of well-known structures and techniques are not shown, to avoid unnecessarily obscuring the present application; and sizes of part of structures may be exaggerated for clarity. In addition, the features, structures, or characteristics described hereinafter may be combined in one or more embodiments in any appropriate manner.

The orientation terms in the following description are directions shown in the drawings, which do not limit a tower segment, a tower, a method for dividing a tower segment and specific structures of a wind turbine according to the present application. In the description of the present application, it should be noted that, unless being specifically defined, terms "mount" and "connect" should be understood broadly, which, for example, may be fixedly connected or detachably connected or integrally connected; and may be directly connected or indirectly connected. For those skilled in the art, the specific meaning of the above terms in the present application may be understood according to specific circumstances.

For better understanding the present application, the tower segment, the tower, the method for dividing the tower segment, and the wind turbine according to the embodiment of the present application are described hereinafter in detail in conjunction with FIGS. 1 to 12.

Referring to FIG. 1, FIG. 1 is a schematic view showing the structure of a tower of according to the embodiment of the present application. The tower provided according to the embodiment of the present application includes two or more tower segments 100, and the two or more tower segments 100 are stacked and connected with each other in an axial direction X. In order to facilitate the connection between the tower segments 100, circumferential flanges 30 are provided at two ends of each of the tower segments 100 in the axial direction, and each two adjacent tower segments 100 are connected with each other via the circumferential flanges 30.

The tower segments 100 configured for forming the tower may employ different structural forms, as long as load bearing requirements of the tower and height limit requirements during the transportation of the tower segment 100 can be satisfied. In some optional examples, the tower of the embodiment of the present application may employ the tower segment 100 according to the following embodiment.

Figure 2:
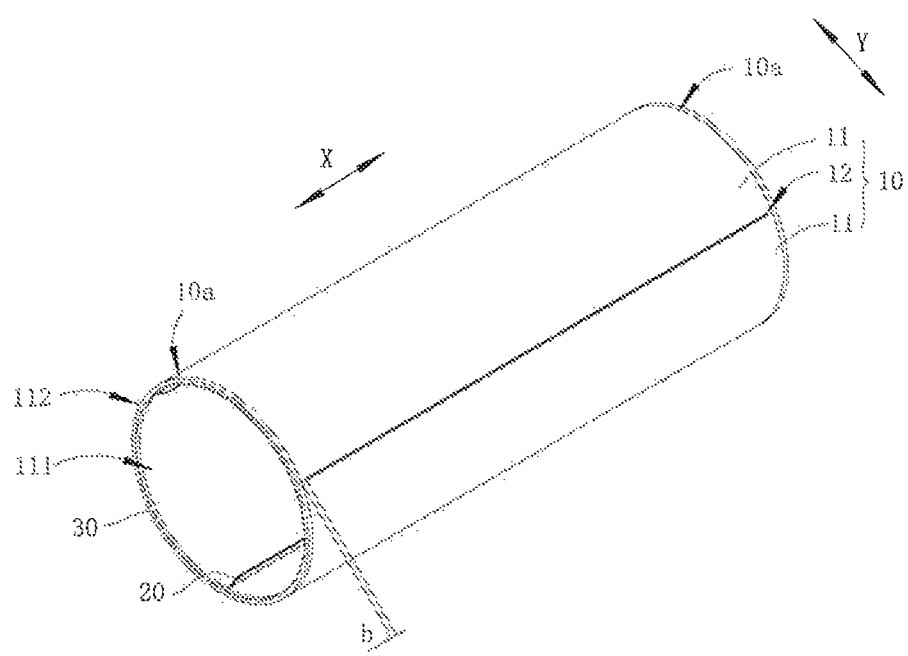
FIG. 2 is a schematic view showing the overall structure of a tower segment according to the embodiment of the present application.
Figure 3:
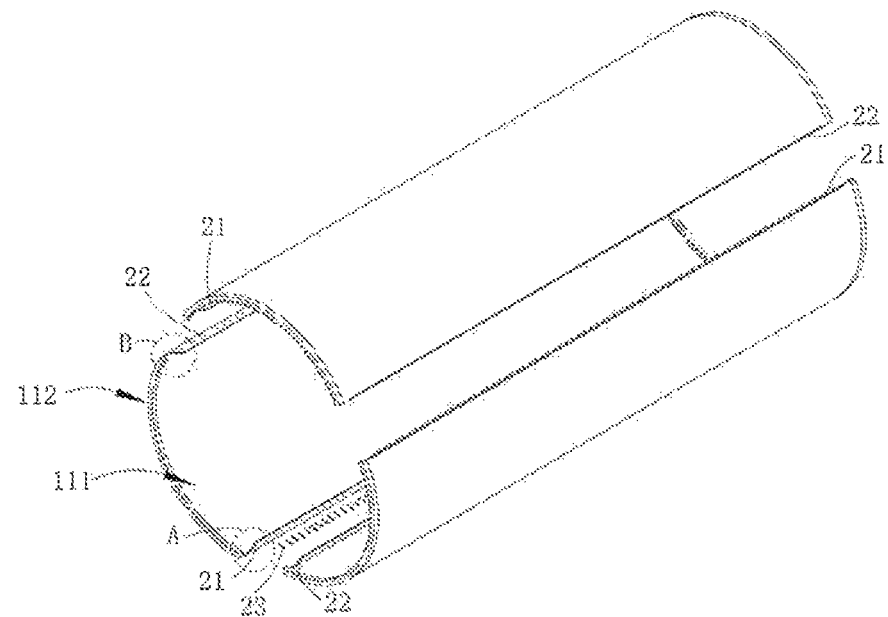
FIG. 3 is a schematic exploded view of the tower segment according to the embodiment of the present application.

Referring to FIGS. 2 and 3, FIG. 2 is a schematic view showing the overall structure of the tower segment 100 according to the embodiment of the present application, and FIG. 3 is a schematic exploded view showing the tower segment 100 according to the embodiment of the present application.

The tower segment 100 is provided according to the embodiment of the present application, including an annular body 10 and a connecting member 20. The annular body 10 has two opposite end faces 10a in the axial direction X thereof. The annular body 10 is formed by assembling multiple tower pieces 11. An accommodating groove 12 extending in the axial direction X is provided between each two adjacent tower pieces 11, and the accommodating groove 12 runs through a wall portion of the annular body 10 in a thickness direction Y of the annular body 10. The two adjacent tower pieces 11 are connected to each other through the connecting member 20. The connecting member 20 includes a first connecting piece 21 and a second connecting piece 22 which can be detachably connected to each other, and the first connecting piece 21 and the second connecting piece 22 are arranged in the accommodating groove 12. A side of the first connecting piece 21 away from the second connecting piece 22 is fixedly connected to an inner annular face ill and an outer annular face 112 of one of the two adjacent tower pieces 11, and a side of the second connecting piece 22 away from the first connecting piece 21 is fixedly connected to an inner annular face 111 and an outer annular face 112 of the other of the two adjacent tower pieces 11.

According to the tower segment 100 of the embodiment of the present application, the connection strength between the connecting member 20 and the tower pieces 11 is high, and the damage to the tower pieces 11 is small, so that when the tower pieces are assembled with each other, the connection is simple and a gap between the tower pieces is small, and thus the load bearing capability of the tower is ensured.

Specifically, the annular body 10 is an annular cylindrical structure, and the accommodating groove 12 may employ different groove structures, such as a rectangular groove. In some optional embodiments, the accommodating groove 12 may be an obround groove. The accommodating groove 12 may be formed by an enclosure defined by a first recess and a second recess. The first recess is located in one of the two adjacent tower pieces 11, the second recess is located in the other of the two adjacent tower pieces 11, and the first recess and the second recess have the same structure and are symmetrically arranged. A circumferential flange 30 may be provided at each of two end faces 10a of the two ends of the annular body 10 in the axial direction thereof, so that when the annular body 10 is applied to the tower, it is convenient for connecting the annular body 10 with annular bodies of other tower segments 100.

The first connecting piece 21 of the connecting member 20 may be connected with the inner annular face 111 and the outer annular face 112 of the corresponding tower piece 11 through fillet welding, and the second connecting piece 22 may be connected with the inner annular face 111 and the outer annular face 112 of the corresponding tower piece 11 through fillet welding.

The circumferential flange 30 is required to be welded on the two end faces 10a of the annular body in the axial direction, in order to avoid stress concentration at the circumferential flange 30, in an embodiment, the accommodating groove 12 is located between the two end faces 10a and is spaced apart from the two end faces 10a with a predetermined distance b respectively, and the predetermined distance b is greater than 0. The above arrangement can effectively avoid a stress, which is generated when the first connecting piece 21 and the second connecting piece 22 in the accommodating groove are connected (for example, by welding) to the corresponding tower piece 11, from being transmitted to the circumferential flange 30, or reduce the stress transmitted to the circumferential flange 30, to ensure that the relatively small stress is not enough to cause the stress concentration of the circumferential flange 30.

In some optional embodiments, the predetermined distance b may be any value between 100 mm and 500 mm, including two end values of 100 mm and 500 mm. By allowing the predetermined distance b between the accommodating groove 12 and each of the two end faces 10a of the annular body to be within the above value range, not only the stress concentration of the circumferential flange 30 can be effectively avoided, but also the connection strength between the two adjacent tower pieces 11 can be ensured. Further, the predetermined distance may be any value between 250 mm and 450 mm, and may further be selected to be 400 mm. The performance of the tower segment 100 can be more optimized with the above arrangement.

Figure 4:
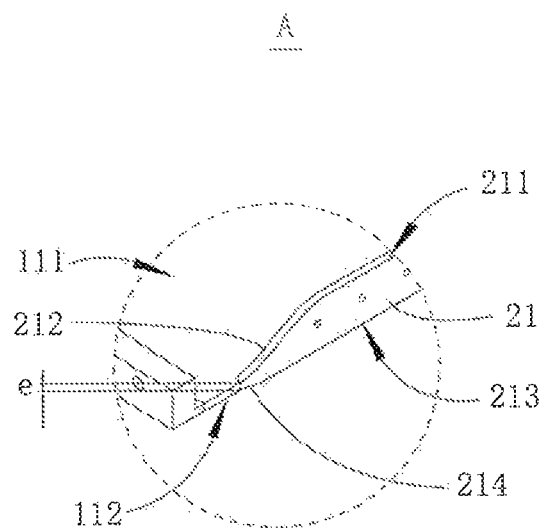
FIG. 4 is an enlarged view of portion A in FIG. 3.

Referring to FIG. 4, FIG. 4 is an enlarged view of portion A in FIG. 3. In an optional embodiment, in the thickness direction Y of the annular body, the first connecting piece 21 has a first surface 211 protruding from the inner annular face 111 of the tower piece 11 connected to the first connecting piece 21. A smooth transition is provided between each of two ends of the first surface 211 in the axial direction X and the inner annular face 111 through a first arc angle 212, and a radius of the first arc angle 212 is greater than or equal to 150 mm. With the above arrangement, the smooth transition is provided between the first surface 211 of the first connecting piece 21 and the inner surface of the tower piece 11 which is connected to the first connecting piece 21, which can effectively improve a fatigue level of the first connecting piece 21.

Optionally, referring to FIG. 4, in the thickness direction Y of the annular body, the first connecting piece 21 has a third surface 213 protruding from the outer annular face 112 of the tower piece 11 connected to the first connecting piece 21. A smooth transition is provided between each of two ends of the third surface 213 in the axial direction X and the outer annular face 112 through a third arc angle 214, and a radius of the third arc angle 214 is greater than or equal to 150 mm. With the above arrangement, the smooth transition is provided between the third surface 213 of the first connecting piece 21 and the outer surface of the tower piece 11 connected to the first connecting piece 21, which can further improve the fatigue level of the first connecting piece 21.

Figure 5:
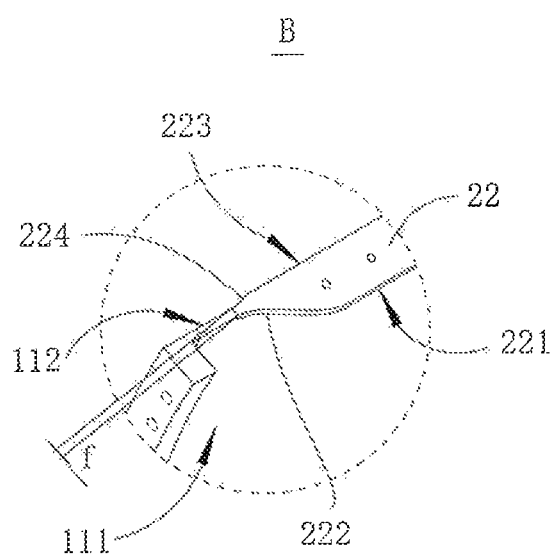
FIG. 5 is an enlarged view of portion B in FIG. 3.

Referring to FIG. 5, and FIG. 5 is an enlarged view of portion B in FIG. 3, in an optional embodiment, in the thickness direction Y of the annular body, the second connecting piece 22 has a second surface 221 protruding from the inner annular face 111 of the tower piece 11 connected to the second connecting piece 22. A smooth transition is provided between each of two ends of the second surface 221 in the axial direction X and the inner annular face 111 through a second arc angle 222, and a radius of the second arc angle 222 is greater than or equal to 150 mm. With the above arrangement, the smooth transition is provided between the second surface 221 of the second connecting piece 22 and the inner surface of the tower piece 11 connected to the second connecting piece 22, which can improve a fatigue level of the second connecting piece 22.

Optionally, with continued reference to FIG. 5, in the thickness direction Y of the annular body; the second connecting piece 22 has a fourth surface 223 protruding from the outer annular face 112 of the tower piece 11 connected to the second connecting piece 22. A smooth transition is provided between each of two ends of the fourth surface 223 in the axial direction X and the outer annular face 112 through a fourth arc angle 224, and a radius of the fourth arc angle 224 is greater than or equal to 150 mm. With the above arrangement, the smooth transition is provided between the fourth surface 223 of the second connecting piece 22 and the outer surface of the tower piece 11 connected to the second connecting piece 22, which can further improve the fatigue level of the second connecting piece 22.

Moreover, with the above arrangement, an overall fatigue level of the connecting member 20 can be reliably improved, and the fatigue level of two ends of the connecting member 20 can be higher than DC80.

With continued reference to FIGS. 4 and 5, in some optional embodiments, the first surface 211 and the third surface 213 of the first connecting piece 21 are arranged opposite to each other in the thickness direction Y of the annular body, and in the axial direction X, two ends of the first surface 211 and the third surface 213 extend toward each other, such that a minimum thickness e of the first connecting piece 21 in the thickness direction Y of the annular body is equal to a thickness of the wall portion of the annular body, thereby further enhancing the fatigue level of the first connecting piece 21.

Optionally, the second surface 221 and the fourth surface 223 of the second connecting piece 22 are arranged opposite to each other in the thickness direction Y of the annular body, and in the axial direction X, two ends of the second surface 221 and the fourth surface 223 extend toward each other, such that a minimum thickness f of the second connecting piece 22 in the thickness direction V is equal to the thickness of the wall portion of the annular body, thereby further enhancing the fatigue level of the second connecting piece 22. Thus, the overall fatigue level of the connecting member 20 is further enhanced.

In specific implementation, the first connecting piece 21 and the second connecting piece 22 may employ different structural forms, for example, a strip-shaped sheet-like structure extending in the axial direction X of the annular body, and the first connecting piece 21 and the second connecting piece 22 may be connected to each other by welding. Of course, in order to ensure the connection strength between adjacent tower pieces 11, optionally, both the first connecting piece 21 and the second connecting piece 22 may be strip-shaped flange structures, and multiple flange holes in the first connecting piece 21 are arranged in one-to-one correspondence with multiple flange holes in the second connecting piece 22 in the axial direction X of the annular body. In order to meet requirements of the connection between the first connecting piece 21 and the second connecting piece 22, the connecting member 20 further includes fasteners 23 for connecting the first connecting piece 21 and the second connecting piece 22. The fasteners 23 can facilitate assembly and disassembly between the tower pieces 11, and ensure the connection strength between the adjacent tower pieces 11.

Therefore, the tower segment 100 according to the embodiment of the present application includes the annular body 10 and the connecting member 20. The connecting member 20 is provided in the accommodating groove 12 between the two adjacent tower pieces 11 of the annular body 10. The accommodating groove 12 runs through the wall portion of the annular body 10 in the thickness direction Y of the annular body 10, and the two adjacent tower pieces 11 are connected with each other through the connecting member 20. Besides, the side of the first connecting piece 21 away from the second connecting piece 22 is fixedly connected with the inner annular face 111 and the outer annular face 112 of one of the two adjacent tower pieces 11, and the side of the second connecting piece 22 away from the first connecting piece 21 is fixedly connected with the inner annular face 111 and the outer annular face 112 of the other of the two adjacent tower pieces 11, that is, each of the connecting pieces is connected with both the inner annular face 111 and the outer annular face 112 of the corresponding tower piece 11 at the same time, which ensures the connection strength between each of the connecting pieces and the corresponding tower piece. Moreover, such arrangement facilitates the connection between the connecting piece and the corresponding tower piece 11, and can reduce the damage to the tower piece 11, so that a gap between the tower pieces 11 is small when the tower pieces 11 are assembled with each other, thereby ensuring the load bearing capability of the tower segment 100 or the tower having the tower segment 100.

Since the tower according to an embodiment of the present application includes the tower segment 100 according to any one of the above embodiments, the connection strength between the two adjacent tower pieces 11 of the tower segment 100 is high. Moreover, the assembling gap between the tower pieces 11 is small, and the assembling effect is good, so that the tower itself has a better load bearing capacity.

A wind turbine is further provided according to an embodiment of the present application. The wind turbine includes the tower according to any one of the above embodiments. Since the tower has the better load bearing capacity, the wind turbine has better safety performance, which ensures its own power generation efficiency.

Figure 6:
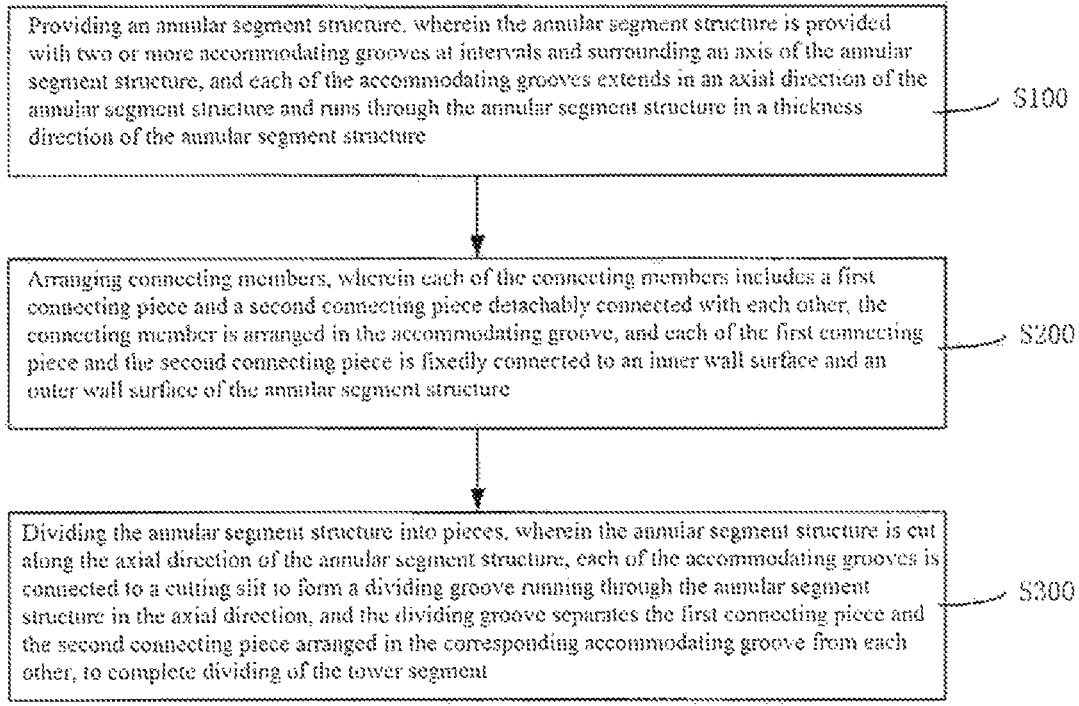
FIG. 6 is a schematic flowchart showing a method for dividing the tower segment according to the embodiment of the present application.

Referring to FIG. 6, FIG. 6 is a schematic flowchart showing a method for dividing the tower segment 100 according to an embodiment of the present application. The method for dividing the tower segment 100 is further provided according to the embodiment of the present application, which includes the following steps:

S100, an annular segment structure 40 is provided, the annular segment structure 40 is provided with two or more accommodating grooves 12 arranged at intervals and surrounding an axis of the annular segment structure 40, and each of the accommodating grooves 12 extends in an axial direction M of the annular segment structure 40 and runs through the annular segment structure 40 in a thickness direction N of the annular segment structure 40;

S200, connecting members 20 are arranged, each of the connecting members 20 includes a first connecting piece 21 and a second connecting piece 22 which are detachably connected with each other, the connecting member 20 is arranged in the accommodating groove 12, and each of the first connecting piece 21 and the second connecting piece 22 is fixedly connected to an inner wall surface 41 and an outer wall surface 42 of the annular segment structure 40; and S300, the annular segment structure 40 is divided into pieces, the annular segment structure 40 is cut along the axial direction M of the annular segment structure 40, each of the accommodating grooves 12 is connected to a cutting slit to form a dividing groove running through the annular segment structure 40 in the axial direction M, and the dividing groove separates the first connecting piece 21 and the second connecting piece 22 arranged in the corresponding accommodating groove 12 from each other, and thus the dividing of the tower segment 100 is completed.

Figure 7:
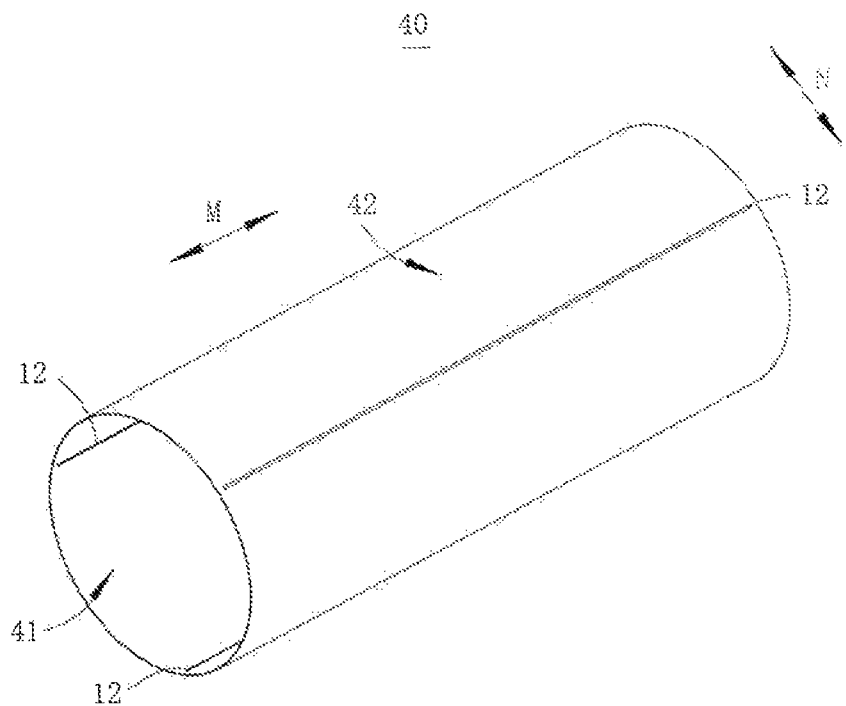
FIG. 7 is an axonometric view showing an annular segment structure according to the embodiment of the present application.

Referring to FIG. 7, FIG. 7 is an axonometric view showing the annular segment structure 40 according to the embodiment of the present application in step S100, as shown in FIG. 7, the annular segment structure 40 is substantially an annular structure. The number of the accommodating grooves 12 may be set according to a diameter of the annular segment structure 40, as long as it can meet the height limit requirements during the transportation. Moreover, a length of each of the accommodating grooves 12 in the axial direction M of the annular segment structure 40 is less than a length of the annular segment structure 40, that is, the accommodating groove 12 is located between two end faces of the annular segment structure 40 in the axial direction M. A predetermined distance between the accommodating groove 12 and each of the two end faces of the annular segment structure 40 is limited the same as the distance between the accommodating groove 12 and each of the two end faces 10a of the annular body 10 in the embodiment as show in FIGS. 2 and 3, which will not be repeated herein.

Figure 8:
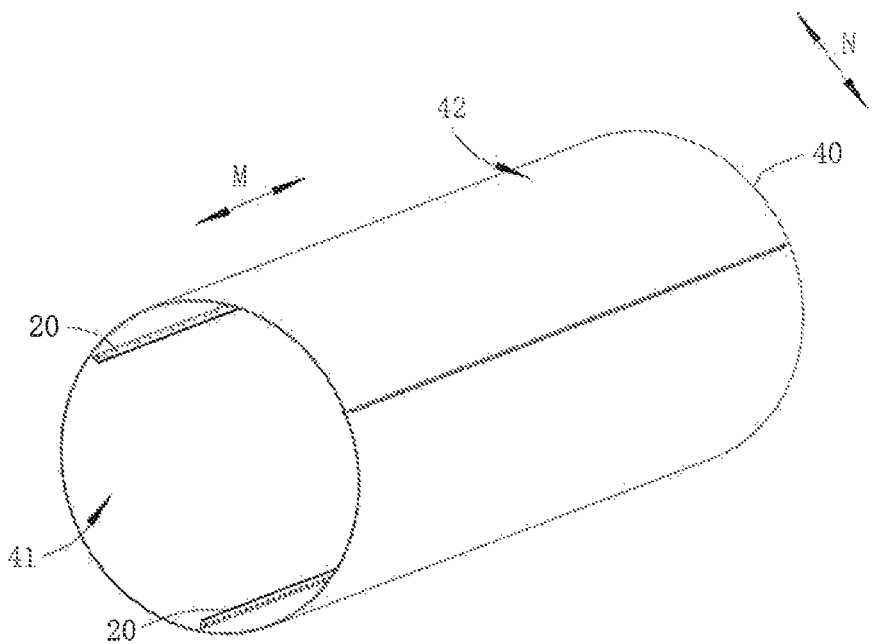
FIG. 8 is an axonometric view showing that the annular segment structure is connected to a connecting member.

Referring to FIG. 8, FIG. 8 is an axonometric view showing that the annular segment structure 40 is connected to the connecting member 20. In step S200, the connecting member 20 is required to be placed in the corresponding accommodating groove 12 in advance, and two opposite surfaces of each of the first connecting piece 21 and the second connecting piece 22 in the thickness direction N of the annular segment structure 40 are allowed to be raised with respect to the corresponding inner annular face 111 and outer annular face 112 of the annular segment structure 40. Then, the first connecting piece 21 and the second connecting piece 22 are fixedly connected with the inner wall surface 41 and the outer wall surface 42 of the annular segment structure 40 through fillet welding or the like. After the first connecting piece 21 and the second connecting piece 22 are connected with the inner wall surface 41 and the outer wall surface 42 of the annular segment structure 40, the circumferential flanges 30 may be connected to two ends of the annular segment structure 40 in the axial direction M, and then step S300 is performed to form the tower as shown in FIGS. 2 and 3, and thus the dividing of the tower segment 100 is completed.

In some optional embodiments, before the annular segment structure 40 is divided into pieces, a connecting step is further provided, which includes connecting the first connecting piece 21 and the second connecting piece 22 with each other. With the above arrangement, it can be ensured that the first connecting piece 21 and the second connecting piece 22 are parallel with each other after the first connecting piece 21 and the second connecting piece 22 are connected with the annular segment structure 40, which is beneficial for reducing the assembling gap between the tower pieces 11 as much as possible when the tower pieces 11 formed later are butted with each other.

Figure 9:
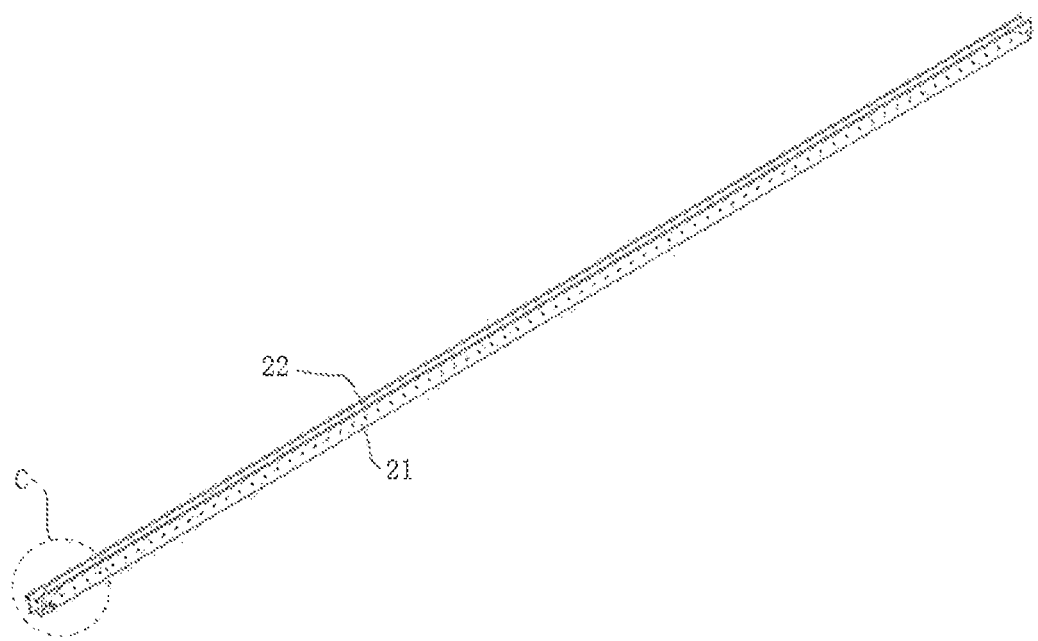
FIG. 9 is a schematic view showing the structure of the connecting member according to the embodiment of the present application in an initial state.
Figure 10:
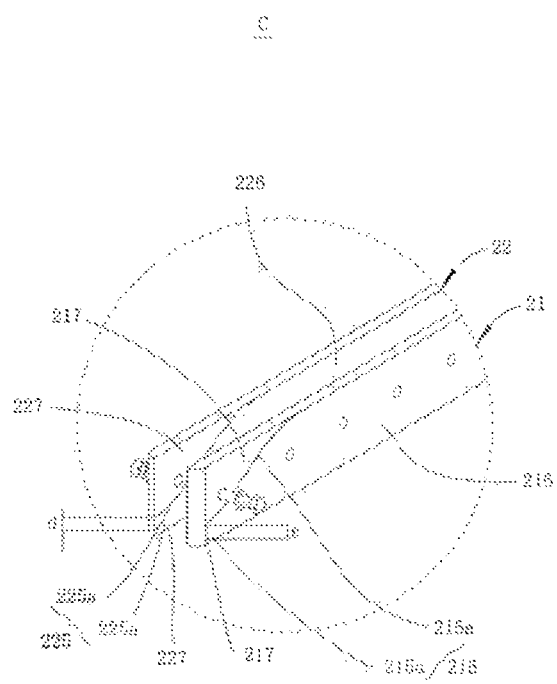
FIG. 10 is an enlarged view of portion C in FIG. 9.

Referring to FIGS. 9 and 10, FIG. 9 is a schematic view showing the structure of the connecting member 20 according to the embodiment of the present application in an initial state; and FIG. 10 is an enlarged view of portion C in FIG. 9. In some optional embodiments, a connecting member 20 preprocessing step is further included before the connecting member 20 is arranged. The connecting member 20 preprocessing step includes providing a first cutting mark 215 on the first connecting piece 21 and a second cutting mark 225 on the second connecting piece 22. The first cutting mark 215 divides the first connecting piece 21 into a first reserved area 216 connected to the annular segment structure 40 and a first area to be cut 217 which is away from the annular segment structure 40. The second cutting mark 225 divides the second connecting piece 22 into a second reserved area 226 connected to the annular segment structure 40 and a second area to be cut 227 which is away from the annular segment structure 40. By providing the first cutting mark 215 and the second cutting mark 225, the subsequent cutting of the first connecting piece 21 and the second connecting piece 22 is facilitated, so that the cutting is more accurate, and thereby improving the fatigue level of the connecting member 20.

Optionally, with continued reference to FIGS. 9 and 10, the connecting member 20 preprocessing step further includes fixedly connecting the first area to be cut 217 of the first connecting piece 21 with the second area to be cut 227 of the second connecting piece 22 which is located in the same accommodating groove 12 as the first connecting piece 21, which can reduce or avoid the deformation of the two ends of each of the first connecting piece 21 and the second connecting piece 22 in the axial direction M of the annular segment structure 40 caused by a welding thermal stress generated during a welding process of the first connecting piece 21 and the second connecting piece 22 with the inner wall surface 41 and the outer wall surface 42 of the annular segment structure 40. The fixed connection between the first area to be cut 217 and the second area to be cut 227 may employ different manners. For example, the first area to be cut 217 and the second area to be cut 227 may be provided with connecting holes oppositely arranged, and the first area to be cut 217 and the second area to be cut 227 may be fixedly connected by the fasteners 23 such as bolts. Of course, the first area to be cut 217 and the second area to be cut 227 may also be connected by welding, which can also meet the connection requirements between the first area to be cut 217 and the second area to be cut 227. In specific implementation, a fixing position between the first area to be cut 217 and the second area to be cut 227 is not limited to one fixing position. Two or more fixing positions may be used for fixing if there's enough space.

In an optional embodiment, in the connecting member 20 preprocessing step, the first cutting mark 215 includes two first cutting segments 215a. Both the two first cutting segments 215a are cutting grooves or cutting lines, and the two first cutting segments 215a start from two end faces of the first connecting piece 21 in the thickness direction N of the annular segment structure 40 respectively, to extend toward each other. A distance c between end points of the two first cutting segments 215a extending toward each other is equal to a thickness of the annular segment structure 40. The end points of the two first cutting segments 225a extending toward each other are located at a corresponding end face of the first connecting piece 21 in the axial direction M of the annular segment structure 40.

Further, the second cutting mark 225 includes two second cutting segments 225a. Both the two second cutting segments 225a are cutting grooves or cutting lines, and the two second cutting segments 225a start from two end faces of the second connecting piece 22 in the thickness direction N of the annular segment structure 40 respectively, to extend toward each other. A distance d between end points of the two second cutting segments 225a extending toward each other is equal to the thickness of the annular segment structure 40. The end points of the two second cutting segments 225a extending toward each other are located at a corresponding end face of the second connecting piece 22 in the axial direction. M of the annular segment structure 40.

With the above arrangement, when the first connecting piece 21 and the second connecting piece 22 after being cut according to the first cutting mark 215 and the second cutting mark. 225 are connected with the inner wall surface 41 and the outer wall surface 42 of the annular segment structure 40, smooth transitions can be provided between the first connecting piece 21 and the second connecting piece 22 and the inner wall surface 41 and the outer wall surface 42, which avoids stress concentration, and thereby improving the fatigue level of the connecting member 20.

Figure 11:
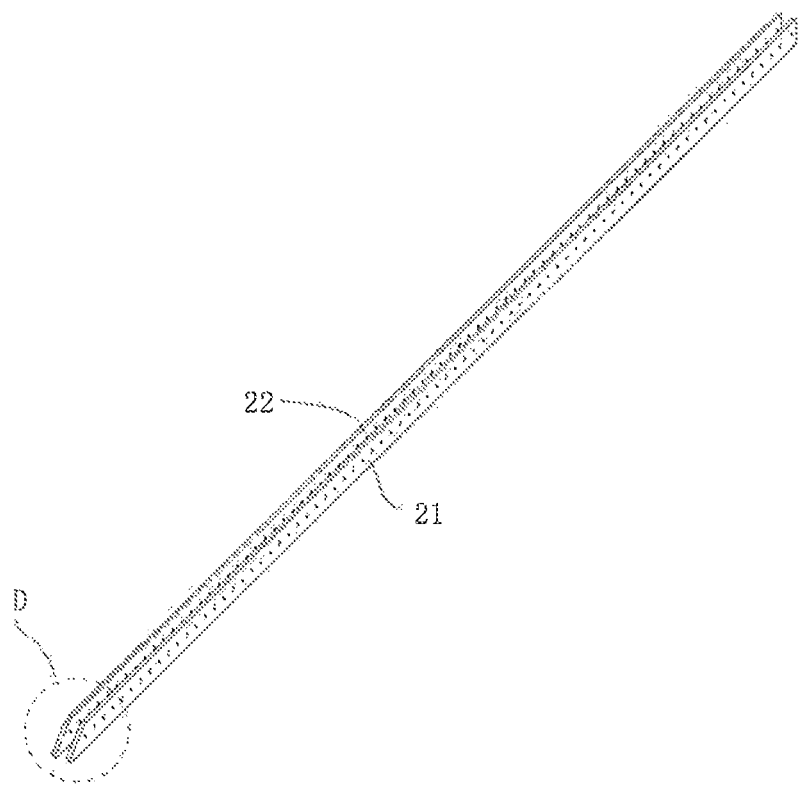
FIG. 11 is a schematic view showing the structures of a first connecting piece and a second connecting piece after the first connecting piece and the second connecting piece are cut.
Figure 12:
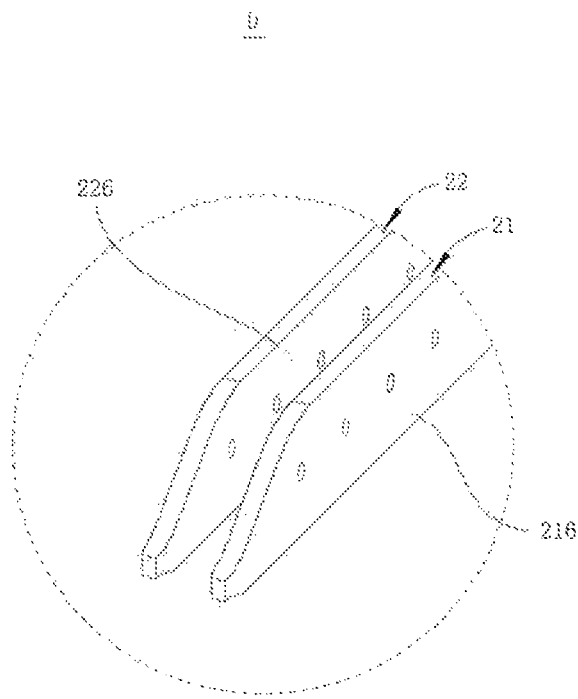
FIG. 12 is an enlarged view of portion D in FIG. 11.

Referring to FIGS. 11 and 12, FIG. 11 is a schematic view showing the structures of the first connecting piece 21 and the second connecting piece 22 after the first connecting piece 21 and the second connecting piece 22 are cut; and FIG. 12 is an enlarged view of portion A in FIG. 11. In an optional embodiment, a connecting member 20 cutting step is further provided before the annular segment structure 40 is divided into pieces. The connecting member 20 cutting step includes cutting the first area to be cut 217 of the first connecting piece 21 in each accommodating groove 12 according to the first cutting mark 215, so that the first area to be cut 217 is separated from the first reserved area 216, and further includes cutting the second area to be cut 227 of the second connecting piece 22 in each accommodating groove 12 according to the second cutting mark. 225, so that the second area to be cut 227 is separated from the second reserved area 226, and cuts of the first connecting piece 21 and the second connecting piece 22 after cutting are polished to be smooth. With the above arrangement, on the basis of ensuring the fatigue level requirements of the connecting member 20, step S300 is more convenient to perform.

Moreover, since the dividing method according to the embodiment of the present application includes the connecting step, a step of releasing the connection between the first connecting piece 21 and the second connecting piece 22 is provided before performing step S300.

Therefore, the method for dividing the tower segment 100 according to the embodiment of the present application can reliably divide the tower segment 100 into multiple tower pieces 11, and the connection strength between the first connecting piece 21 and the second connecting piece 22 of the connecting member 20 and the corresponding tower pieces 11 is high. When the adjacent tower segments 11 are assembled with each other, the assembling gap is small, which can meet the height limit requirements of the tower segment 100 during the transportation, moreover, the load bearing capacity of the tower segment 100 formed by assembling the tower pieces 11 which are formed by the above dividing method is high, so the dividing method is easy to be popularized.

Although the present application is described with reference to the preferred embodiments, various improvements can be made to the present application and the components therein can be replaced with equivalents without departing from the scope of the present application. In particular, as long as there is no structural conflict, the technical features mentioned in each of the embodiments can be combined in any way. The present application is not limited to the particular embodiments disclosed, but includes all technical solutions falling within the scope of the present application as defined by the claims.

The invention claimed is:

1. A tower segment, comprising:
   an annular body, wherein the annular body has two opposite end faces in an axial direction of the annular body, the annular body is formed by assembling a plurality of tower pieces, and an accommodating groove extending in the axial direction is provided between each two adjacent tower pieces, and the accommodating groove runs through a wall portion of the annular body in a thickness direction of the annular body; and
   a connecting member, wherein the two adjacent tower pieces are connected to each other through the connecting member, the connecting member comprises a first connecting piece and a second connecting piece detachably connected to each other, and the first connecting piece and the second connecting piece are arranged in the accommodating groove; and wherein
   a side of the first connecting piece away from the second connecting piece is fixedly connected to an inner annular face and an outer annular face of one of the two adjacent tower pieces, and a side of the second connecting piece away from the first connecting piece is fixedly connected to an inner annular face and an outer annular face of the other of the two adjacent tower pieces.

2. The tower segment according to claim 1, wherein the accommodating groove is located between the two end faces and is spaced apart from the two end faces by a predetermined distance, and the predetermined distance is greater than 0.

3. The tower segment according to claim 2, wherein the predetermined distance ranges from 100 mm to 500 mm.

4. The tower segment according to claim 1, wherein in the thickness direction, the first connecting piece has a first surface protruding from the inner annular face of the tower piece connected to the first connecting piece, a smooth transition is provided between each of two ends of the first surface in the axial direction and the inner annular face through a first arc angle, and a radius of the first arc angle is greater than or equal to 150 mm; and/or,
   in the thickness direction, the second connecting piece has a second surface protruding from the inner annular face of the tower piece connected to the second connecting piece, a smooth transition is provided between each of two ends of the second surface in the axial direction and the inner annular face through a second arc angle, and a radius of the second arc angle is greater than or equal to 150 mm.

5. The tower segment according to claim 1, wherein in the thickness direction, the first connecting piece has a third surface protruding from the outer annular face of the tower piece connected to the first connecting piece, a smooth transition is provided between each of two ends of the third surface in the axial direction and the outer annular face through a third arc angle, and a radius of the third arc angle is greater than or equal to 150 mm; and/or,
   in the thickness direction, the second connecting piece has a fourth surface protruding from the outer annular face of the tower piece connected to the second connecting piece, a smooth transition is provided between each of two ends of the second surface in the axial direction and the outer annular face through a fourth arc angle, and a radius of the fourth arc angle is greater than or equal to 150 mm.

6. The tower segment according to claim 1, wherein the first connecting piece has a first surface and a third surface arranged opposite to each other in the thickness direction, and in the axial direction, two ends of the first surface and the third surface extend toward each other, to allow a minimum thickness of the first connecting piece in the thickness direction to be equal to a thickness of the wall portion; and/or, the second connecting piece has a second surface and a fourth surface arranged opposite to each other in the thickness direction, and two ends of the second surface and the fourth surface in the axial direction extend toward each other, to allow a minimum thickness of the second connecting piece in the thickness direction to be equal to the thickness of the wall portion.

7. The tower segment according to claim 1, wherein both the first connecting piece and the second connecting piece are strip-shaped flange structures, and the connecting member further comprises a fastener configured for connecting the first connecting piece and the second connecting piece.

8. A tower, comprising two or more tower segments according to claim 1, wherein the two or more tower segments are stacked and connected with each other in the axial direction.

9. A wind turbine, comprising the tower according to claim 8.

10. The tower segment according to claim 2, wherein in the thickness direction, the first connecting piece has a first surface protruding from the inner annular face of the tower piece connected to the first connecting piece, a smooth transition is provided between each of two ends of the first surface in the axial direction and the inner annular face through a first arc angle, and a radius of the first arc angle is greater than or equal to 150 mm; and/or, in the thickness direction, the second connecting piece has a second surface protruding from the inner annular face of the tower piece connected to the second connecting piece, a smooth transition is provided between each of two ends of the second surface in the axial direction and the inner annular face through a second arc angle, and a radius of the second arc angle is greater than or equal to 150 mm.

11. The tower segment according to claim 2, wherein in be thickness direction, the first connecting piece has a third surface protruding from the outer annular face of the tower piece connected to the first connecting piece, a smooth transition is provided between each of two ends of the third surface in the axial direction and the outer annular face through a third arc angle, and a radius of the third arc angle is greater than or equal to 150 mm; and/or in the thickness direction, the second connecting piece las a fourth surface protruding from the outer annular face of the tower piece connected to the second connecting piece, a smooth transition is provided between each of no ends of the second surface in the axial direction and the outer annular face through a fourth arc angle, and a radius of the fourth arc angle is greater than or equal to 150 mm.

12. The tower segment according to claim 2, wherein the first connecting piece has a first surface and a third surface arranged opposite to each other in the thickness direction, and in the axial direction, two ends of the first surface and the third surface extend toward each other, to allow a minimum thickness of the first connecting piece in the thickness direction to be equal to a thickness of the wall portion; and/or the second connecting piece has a second surface and a fourth surface arranged opposite to each other in the thickness direction, and two ends of the second surface and the fourth surface in the axial direction extend toward each other, to allow a minimum thickness of the second connecting piece in the thickness direction to be equal to the thickness of the wall portion.

13. A method for dividing a tower segment, comprising following steps:

providing an annular segment structure, wherein the annular segment structure is provided with two or more accommodating grooves arranged at intervals and surrounding an axis of the annular segment structure, and each of the accommodating grooves extends in an axial direction of the annular segment structure and runs through the annular segment structure in a thickness direction of the annular segment structure;

arranging connecting members, wherein each of the connecting members comprises a first connecting piece and a second connecting piece detachably connected with each other, the connecting member is arranged in the accommodating groove, and each of the first connecting piece and the second connecting piece is fixedly connected to an inner wall surface and an outer wall surface of the annular segment structure; and dividing the annular segment structure into pieces, wherein the annular segment structure is cut along the axial direction of the annular segment structure, each of the accommodating grooves is connected to a cutting slit to form a dividing groove running through the annular segment structure in the axial direction, and the dividing groove separates the first connecting piece and the second connecting piece arranged in the corresponding accommodating groove from each other, to complete dividing of the tower segment.

14. The method for dividing the tower segment according to claim 13, further comprising a connecting step before dividing the annular segment structure into pieces, wherein the connecting step comprises connecting the first connecting piece and the second connecting piece with each other.

15. The method for dividing the tower segment according to claim 13, further comprising a connecting member preprocessing step before arranging the connecting member, wherein the connecting member preprocessing step comprises providing a first cutting mark on the first connecting piece and providing a second cutting mark on the second connecting piece; wherein the first cutting mark divides the first connecting piece into a first reserved area connected to the annular segment structure and a first area to be cut which is away from the annular segment structure; and the second cutting mark divides the second connecting piece into a second reserved area connected to the annular segment structure and a second area to be cut which is away from the annular segment structure.

16. The method for dividing the tower segment according to claim 15, wherein the connecting member preprocessing step further comprises fixedly connecting the first area to be cut of the first connecting piece with the second area to be cut of the second connecting piece which is located in the same accommodating groove as the first connecting piece.

17. The method for dividing the tower segment according to claim 15, wherein in the connecting member preprocessing step, the first cutting mark is comprises two first cutting segments, both the two first cutting segments are cutting grooves or cutting lines, and the two first cutting segments start from two end faces of the first connecting piece in the thickness direction respectively, to extend toward each other, and a distance between end points of the two first cutting segments extending toward each other is equal to a thickness of the annular segment structure; and/or, the second cutting mark comprises two second cutting segments, both the two second cutting segments are cutting grooves or cutting lines, the two second cutting segments start from the two end faces of the second connecting piece in the thickness direction respectively, to extend toward each other, and a distance between end points of the two second cutting segments extending toward each other is equal to the thickness of the annular segment structure.

18. The method for dividing the tower segment according to claim 15, further comprising a connecting member cutting step before dividing the annular segment structure into pieces, wherein the connecting member cutting step comprises cutting the first area to be cut of the first connecting piece in each accommodating groove according to the first cutting mark, to allow the first area to be cut to be separated from the first reserved area, and cutting the second area to be cut of the second connecting piece in each accommodating groove according to the second cutting mark, to allow the second area to be cut to be separated from the second reserved area.

* * * * *